(12) United States Patent
Nozaki et al.

(10) Patent No.: US 7,168,516 B2
(45) Date of Patent: Jan. 30, 2007

(54) AIR CLEANER DEVICE IN VEHICLE (75) Inventors: Naoki Nozaki, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/228,202

(22) Filed: Sep. 19, 2005

(65) Prior Publication Data
US 2006/0065231 A1    Mar. 30, 2006

(30) Foreign Application Priority Data
Sep. 29, 2004   (JP)   ............... 2004-284668

(51) Int. Cl.
*B60K 13/06*   (2006.01)
(52) U.S. Cl. ............ 180/68.3; 180/68.1; 180/309; 123/198 E; 123/41.56; 123/41.58; 123/41.7; 123/41.21
(58) Field of Classification Search ............ 123/198 E, 123/41.56, 41.58, 41.7; 180/68.1, 68.3
See application file for complete search history.

(56) References Cited
U.S. PATENT DOCUMENTS 5,086,858 A * 2/1992 Mizuta et al. ............. 180/68.3
5,195,484 A * 3/1993 Knapp ..................... 123/198 E
5,251,713 A * 10/1993 Enokimoto ................ 180/68.4
6,622,806 B1 * 9/2003 Matsuura ................... 180/68.1
6,823,956 B2 * 11/2004 Shimizu .................... 180/68.1

FOREIGN PATENT DOCUMENTS

JP          61-295128 A       12/1986

* cited by examiner

*Primary Examiner*—Stephen K. Cronin
*Assistant Examiner*—Huy Tran
(74) *Attorney, Agent, or Firm*—Birch, Stewart, Kolasch & Birch, LLP (57) ABSTRACT

An air cleaner device for a vehicle is provided with an air cleaner body containing an air cleaner element and a snorkel connected to the air cleaner body to introduce the outside air into the air cleaner body. The snorkel extends forward of the vehicle past a side of a cylinder portion which projects upward from an engine, and a front end of the snorkel opens between right and left seats of the vehicle. With this configuration, even if the air cleaner body of the air cleaner device should be flooded, it is difficult for water to enter into the interior. Further, it is difficult for the air cleaner body to be influenced by heat, and difficult for dust to get into the air cleaner body.

20 Claims, 6 Drawing Sheets

AIR CLEANER DEVICE IN VEHICLE

CROSS-REFERENCE TO RELATED APPLICATION

The present application claims priority under 35 U.S.C. §119 to Japanese Patent Application No. 2004-284668, filed Sep. 29, 2004, the entire contents of which are hereby incorporated by reference.

BACKGROUND OF THE INVENTION

1. Field of the Invention

The present invention relates to an air cleaner device in a vehicle.

2. Description of Background Art

As a conventional vehicular air cleaner device, an air cleaner disposed in a rear portion of a vehicle body is known (see, for example, Japanese Patent Laid-Open No. Sho 61-295128).

The following description is now provided about FIGS. 1, 3 and 4 in Japanese Patent Laid-Open No. Sho 61-295128.

Figure 4:
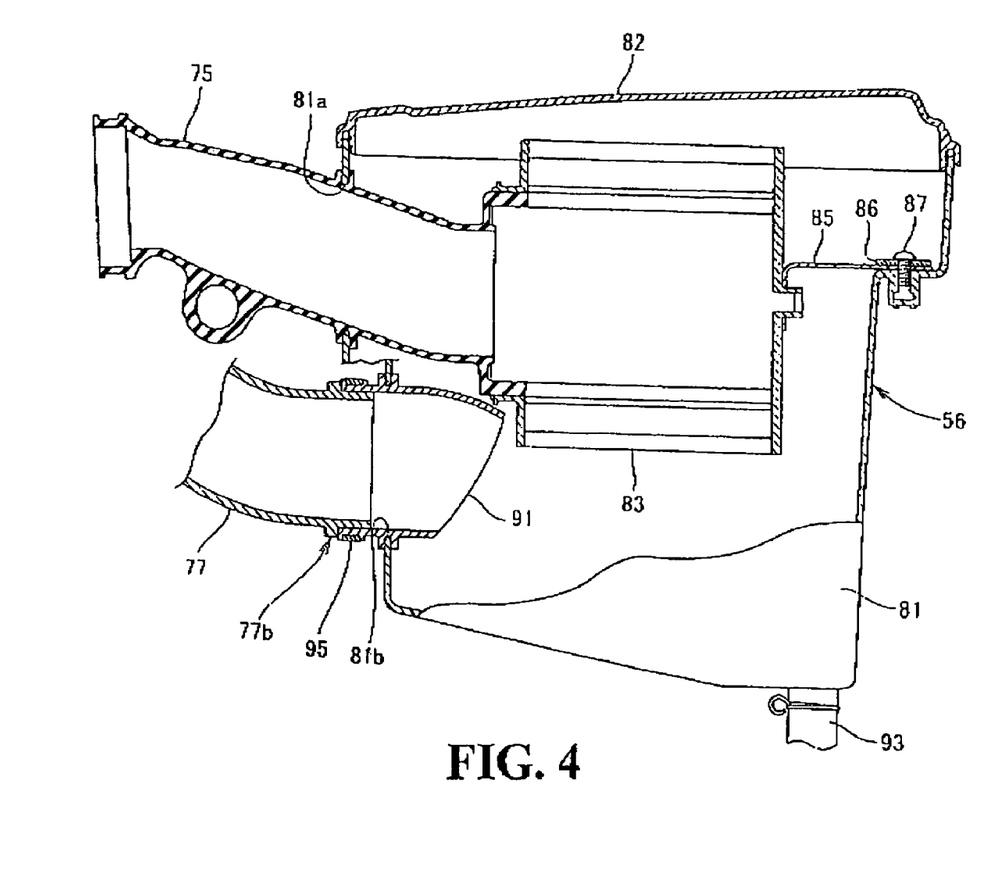
FIG. 4 is a sectional view of the air cleaner device.

In FIG. 4, a small-sized vehicle 1 is provided with a pair of right and left side tubes 2a which constitute a body frame 2, and an engine body 22 and an air cleaner 20 are disposed between the side tubes 2a. Numeral 3 denotes a seat disposed in front of the engine body 22 and numeral 6 denotes a rear wheel.

Figure 3:
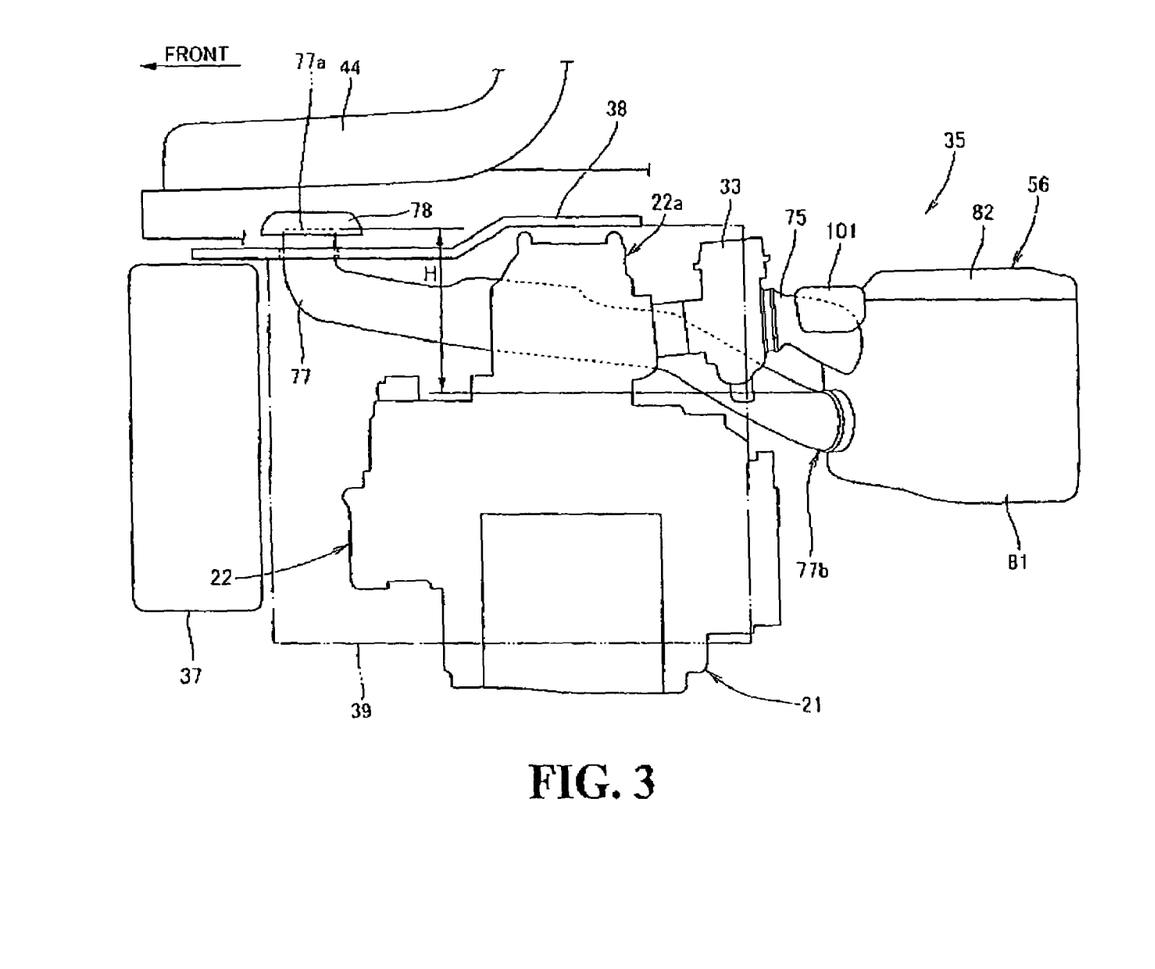
FIG. 3 is a side view of a principal portion of the air cleaner device.

In FIG. 3, the air cleaner 20 is connected to the engine body 22 through a carburetor 21 disposed in front of the air cleaner 20.

Figure 1:
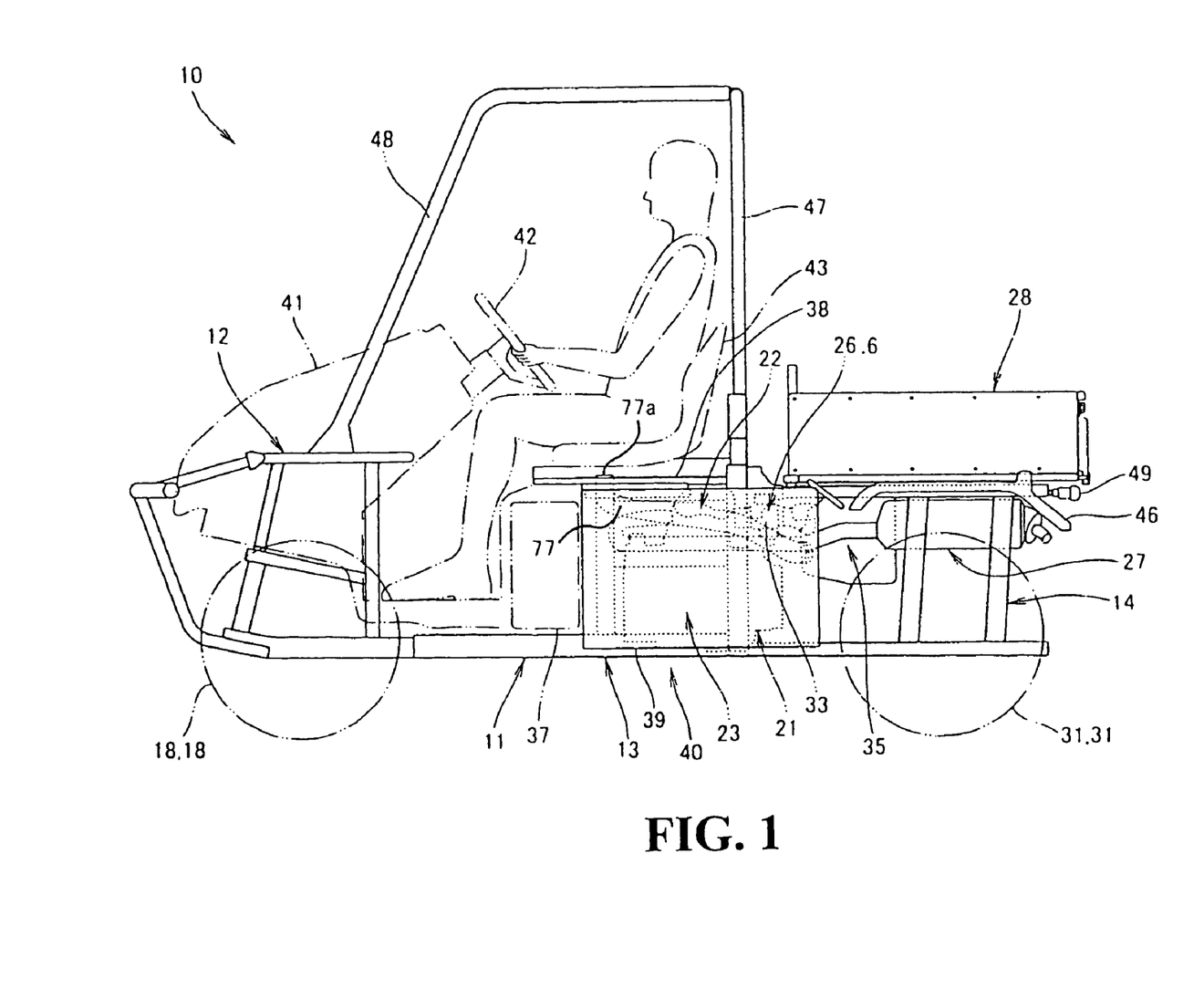
FIG. 1 is a side view of a vehicle provided with an air cleaner device embodying the present invention.

In FIG. 1, an exhaust pipe is connected to a front portion of the engine body 22 and a muffler 24 extending substantially in the longitudinal direction of the vehicle is connected to an end portion of the exhaust pipe. The muffler 24 and the air cleaner 20 disposed behind the engine body 22 are both disposed between the side tubes 2a.

For example, in the case of a vehicle having a rear cargo bed, the engine body 22 and the air cleaner 20 are disposed low, or in the case of an all terrain vehicle adapted to run across rivers or marshes, it is necessary to take into account the influence of water-covering on the air cleaner 20.

In the case of a small-sized vehicle 1, a large space is present between the right and left side tubes 2a and therefore it is possible to attain the reduction in size of the vehicle by shortening the distance between the side tubes 2a. However, since for example the exhaust pipe and the muffler 24 generate heat, it is necessary that the arrangement of surrounding components be taken into account.

Further, the arrangement of an intake port for introducing air into the air cleaner 20 must also be taken into account lest an element installed within the air cleaner 20 should become dirty in an early stage due to dust rolled up by rear wheels 6.

SUMMARY AND OBJECTS OF THE INVENTION

It is an object of the present invention to make water difficult to enter the interior of a body of an air cleaner device in a vehicle even when the air cleaner body is covered with water, and to make the air cleaner body difficult to be influenced by heat, and further make it difficult for dust to enter the interior of the air cleaner body.

According to a first aspect of the present invention, a vehicle with right and left seats mounted to a body frame and an engine disposed below the seats, includes an air cleaner device disposed behind the engine to supply air to the engine. The air cleaner device includes an air cleaner body containing an air cleaner element and a snorkel connected to the air cleaner body to introduce the outside air into the air cleaner body. The snorkel extends forward of the vehicle past the side of a cylinder portion which projects upward from the engine. The front end of the snorkel is opened between the right and left seats.

According to a second aspect of the present invention, a pair of right and left side frames provided in the body frame extend in the longitudinal direction of the vehicle, an exhaust pipe extends backward of the vehicle from a front portion of the engine, and a muffler connects to a rear end of the exhaust pipe. Further, the air cleaner body is disposed between the right and left side frames and spacedly from the muffler by being inclined relative to the longitudinal direction of the vehicle when the muffler is disposed between the right and left side frames.

According to the first aspect of the present invention, since a snorkel is provided in an air cleaner body in a vehicle provided with right and left seats, for example even if the air cleaner body is disposed at a position lower than the seats, it is possible to minimize the influence of water-covering. Besides, even when the air cleaner body is covered with water, the water is difficult to enter a front-end opening of the snorkel and thus it is possible to make the entry of water into the air cleaner body difficult. Moreover, the front end of the snorkel is opened between the right and left seats, so when the vehicle runs in a deep water level, a driver can easily grasp the degree of water-covering in the snorkel opening and can take a countermeasure while checking the opening at a close distance. Thus, the reliability of the vehicle when running in a river, a marsh or the like can be improved.

Further, since air is introduced through the snorkel which opens between the right and left seats where there is little dust rolled up by the rear wheels, it is possible to minimize the entry of dust into the air cleaner body.

According to the second aspect of the present invention, since the air cleaner body is disposed between the right and left side frames and spacedly from the muffler by being inclined relative to the vehicular longitudinal direction, the distance between the air cleaner body and the exhaust pipe and the distance between the air cleaner body and the muffler can be made larger and hence the air cleaner body can be made difficult to be influenced by heat from the exhaust pipe and the muffler. Consequently, it is possible to simplify or omit an anti-heat member for the air cleaner and thereby attain the reduction of cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

FIG. 1 is a side view of a two seater four wheel drive vehicle provided with an air cleaner device embodying the present invention, in which the vehicle 10 includes a body frame 11 (including a front frame 12, a center frame 13 and a rear frame 14), right and left front wheels 18, a power unit 21 (including an engine 22 and a transmission 23) mounted to the center frame 13, an intake unit 26 disposed behind the engine 22 to feed air and fuel to the engine, an exhaust unit 27 extending backward from a front portion of the engine 22, a cargo bed 28 secured to an upper portion of the rear frame 14 tiltably, and right and left rear wheels 31.

The intake unit 26 includes a carburetor 33 connected to the engine 22 and an air cleaner device 35 connected to the carburetor 33.

FIG. 1 also shows a fuel tank 37, an upper partition wall 38 for partitioning the power unit 21 and a passenger room from each other, a pair of right and left side partition walls 39 (only this-side one 39 is shown) for partitioning the power unit 21 and the right and left edge portions of the vehicle body, an engine room 40 surrounded by the fuel tank 37, the partition wall 38 and the right and left side partition walls 39, a front cover 41, a steering wheel 42, right and left seats 43, 44 (only this-side one 43 is shown) secured to the center frame 13, rear fenders 46, 46 (only this-side one 46 is shown), right and left roll bars 47, 47 (only this-side one 47 is shown) erected on the center frame 13, denote upper frames 48, 48 (only this-side one 48 is shown) connected bridgewise between the front frame 12 and the roll bars 47, and denote tail lamps 49, 49 (only this-side one 49 is shown).

Figure 2:
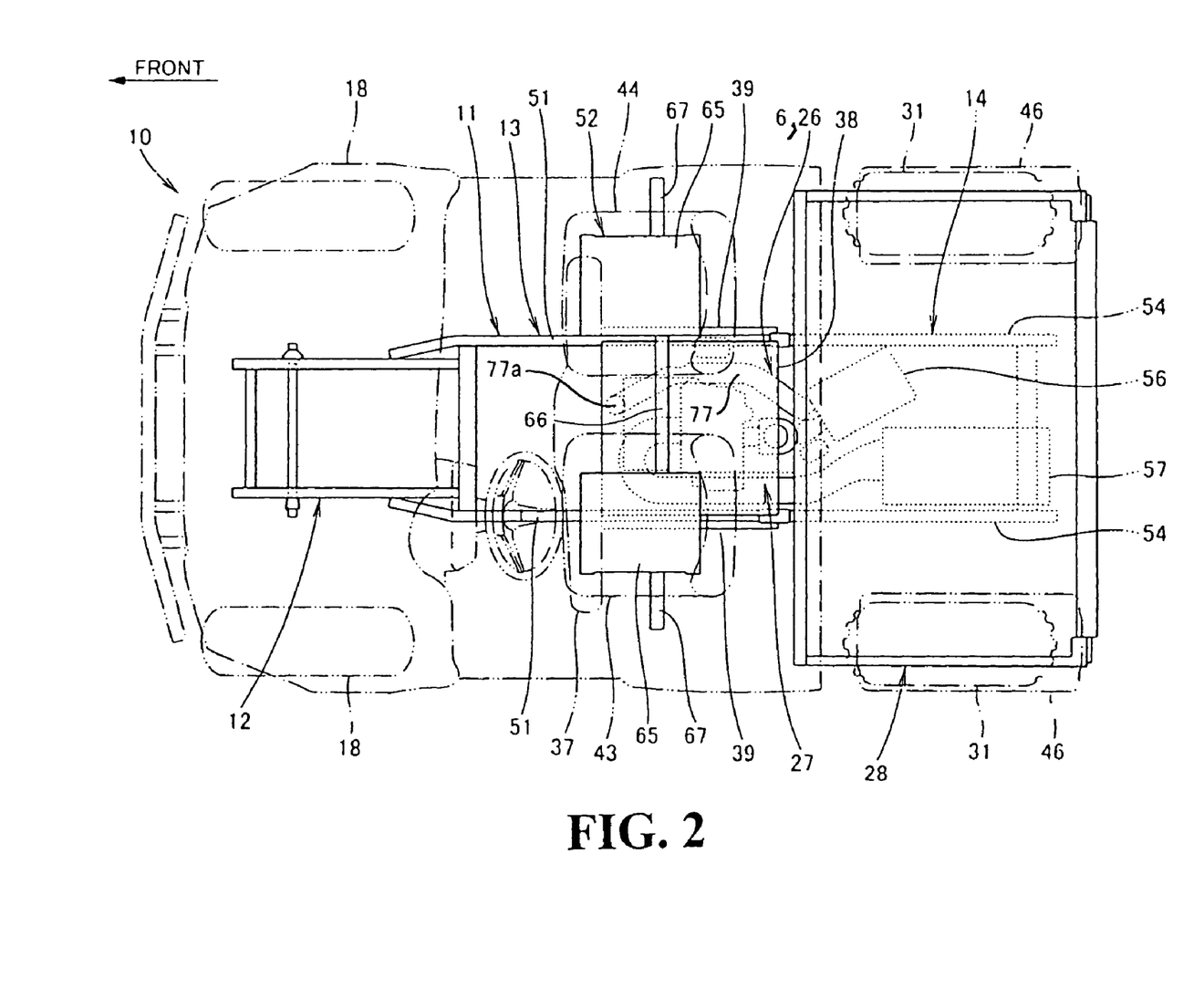
FIG. 2 is a plan view of the vehicle.

FIG. 2 is a plan view of the vehicle related to the present invention (the arrow FRONT in the figure represents the front side of the vehicle). In the same figure, a pair of right and left center side frames 51 are provided in the center frame 13 of the body frame 11, a seat frame member 52 is secured to the center side frames 51, right and left seats 43, 44 are secured to the seat frame member 52, a pair of right and left rear side frames 54 are provided in the rear frame 14 of the body frame 11, and an air cleaner body 6 which constitutes the intake unit 26 and a muffler 57 which constitutes the exhaust unit 27 are disposed between the rear side frames 54 in plan view.

The seat frame member 52 includes a pair of seat support plates 65 for supporting the seats 43 and 44, a connecting frame 66 for connecting the seat support plates 65 with each other, and side frames 67 projecting sideways respectively from the seat support plates 65. The side frames 67 support elbow rests (not shown) conjointly with a front portion of the cargo bed 28.

The rear frame 14 includes the pair of right and left rear side frames 54 and the cargo bed 28 attached thereto.

The fuel tank 37 is disposed so as to extend below the seats 43 and 44 and in the vehicular transverse direction.

The upper partition wall 38 has a width in the vehicular transverse direction almost equal to the spacing between the center side frames 51 and its length in the vehicular longitudinal direction is set to a length at which the power unit 21 is substantially hidden in plan view. The side partition walls 39 are disposed substantially along side faces of the center side frames 51.

FIG. 3 is a side view of a principal portion of the air cleaner device according to the present invention. The air cleaner device 35 includes a connecting tube 75 connected to the carburetor 33, an air cleaner body 56 connected to an end portion of the connecting tube 75, and a snorkel 77 connected to the air cleaner body 56 and extending forward of the vehicle. Numeral 78 denotes a cover which covers an intake port 77a of the snorkel 77 from above.

In the snorkel 77, the intake port 77a is positioned higher than a connecting portion 77b for connection to the air cleaner body 56 and the mark H in the drawing represents a difference in height between an upper end of the connecting portion 77b and the intake port 77a. With such a difference H in height, even in the event of entry of water into the air cleaner body 56 for example when the vehicle runs across a river or a marsh, it is possible to make the water difficult to be sucked into the air cleaner device 35 since the intake port 77a of the snorkel 77 is disposed at a high position.

As illustrated also in FIG. 1, the intake port 77a of the snorkel 77 is disposed between the right and left seats 43, 44 and is thus positioned so that it can be checked by the driver and a passenger sitting on the seats 43 and 44. Therefore, for example even in the event the lower portion of the vehicle should be flooded, it is possible to take an appropriate countermeasure while checking the position of the intake port 77a and the water level.

The upper partition wall 38 is disposed at a position lower than the intake port 77a of the snorkel 77 so as to permit a front end portion of the snorkel to pass therethrough, and it extends up to a position above a cylinder portion 22a.

FIG. 4 is a sectional view of the air cleaner device according to the present invention. In the same figure, the air cleaner body 56 includes an air cleaner case 81, an air cleaner cover 82 which closes an opening of the air cleaner case 81, and air cleaner element 83 disposed within the air cleaner case 81 and the air cleaner cover 82. Numerals 85, 86 and 87 denote a bracket, a washer, and a screw, respectively, for fixing one end of the air cleaner element 83.

In a side face of the air cleaner case 81 there are formed a tube mounting hole 81a for fitting the connecting tube 75 therein and a snorkel-side mounting hole 81b for fitting therein a snorkel connecting pipe 91 to which the snorkel 77 is connected. Numeral 93 denotes a drain hose for the discharge of oil, water, etc. stagnant within the air cleaner case 81.

The connecting tube 75 is connected to an opposite end of the air cleaner element 83.

Connection of the snorkel 77 is performed by inserting the snorkel 77 into a end portion of the snorkel connecting pipe 91 and clamping it with a band 95.

Figure 5:
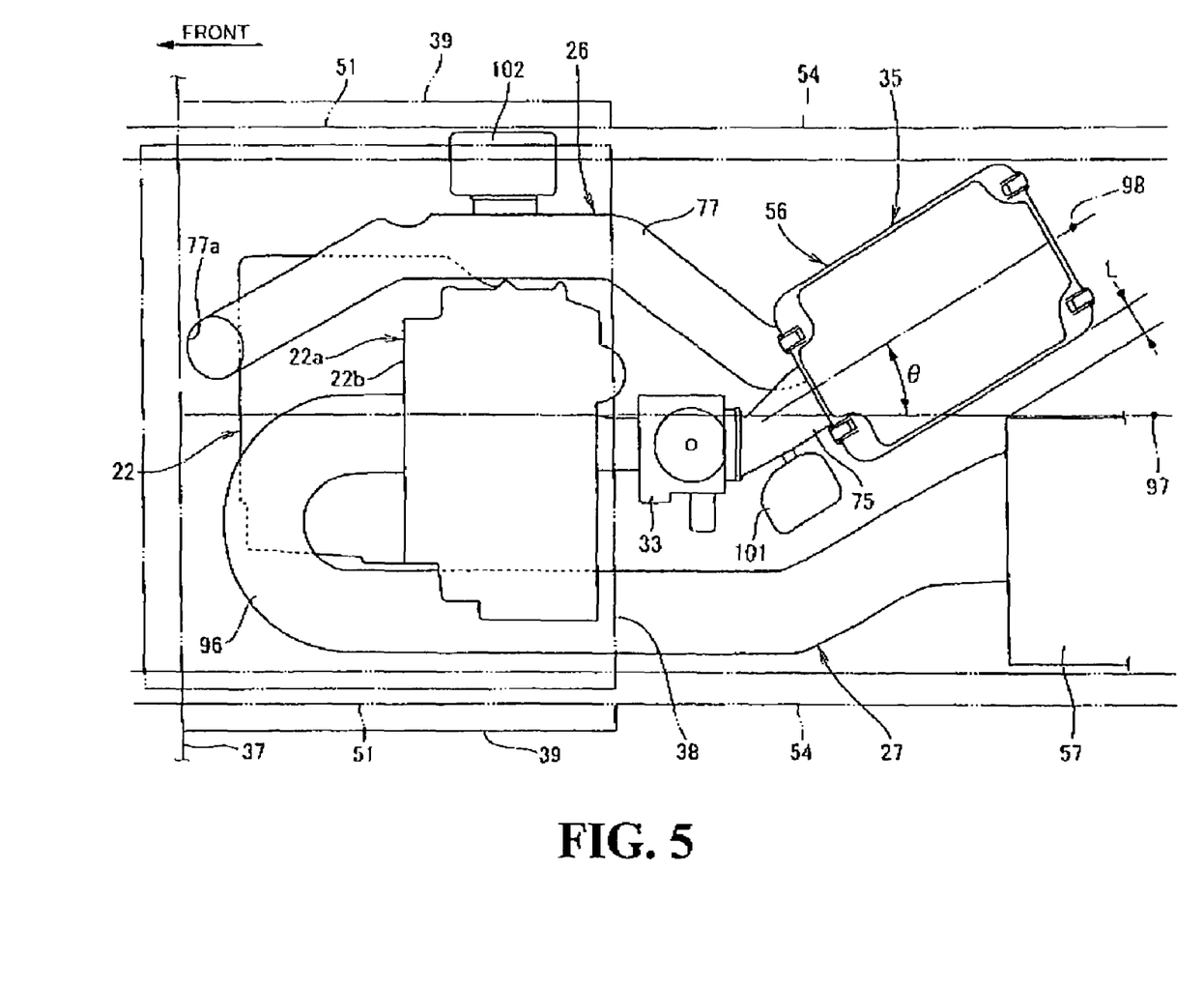
FIG. 5 is a plan view of a principal portion of the air cleaner device.

FIG. 5 is a plan view of a principal portion of the air cleaner device according to the present invention.

The exhaust unit 27 includes an exhaust pipe 96, the exhaust pipe 96 being connected at one end thereof to a front side of the cylinder portion 22a of the engine 22, more particularly a front side of a cylinder head 22b, and extended backward while being bent in U shape, and the muffler 57 connected to a rear end of the exhaust pipe 96.

In the air cleaner device 35, the muffler 57 and the air cleaner body 56 are disposed side by side between the right and left rear side frames 54, the air cleaner body 56 is disposed on the right side in the vehicular transverse direction to enlarge the distance L between the muffler 57 and the air cleaner body 56 lest the air cleaner body 56 should be influenced by the heat of the muffler 57, and a center line 98 of the air cleaner body 56 is inclined by an angle of θ relative to a vehicle body center line 97 extending in the vehicular longitudinal direction.

The influence of the heat of the muffler 57 on the air cleaner body 56 can be minimized within the limited space between the rear side frames 54. The snorkel 77 is bent so as to sidestep the cylinder portion 22a projecting upward from the engine 22.

FIG. 5 also illustrates a resonator 101 connected to an intermediate position of the connecting tube 75 and a resonator 102 connected to an intermediate position of the snorkel 77. The resonators 101 and 102 function to diminish intake noise of the intake unit 26.

Figure 6:
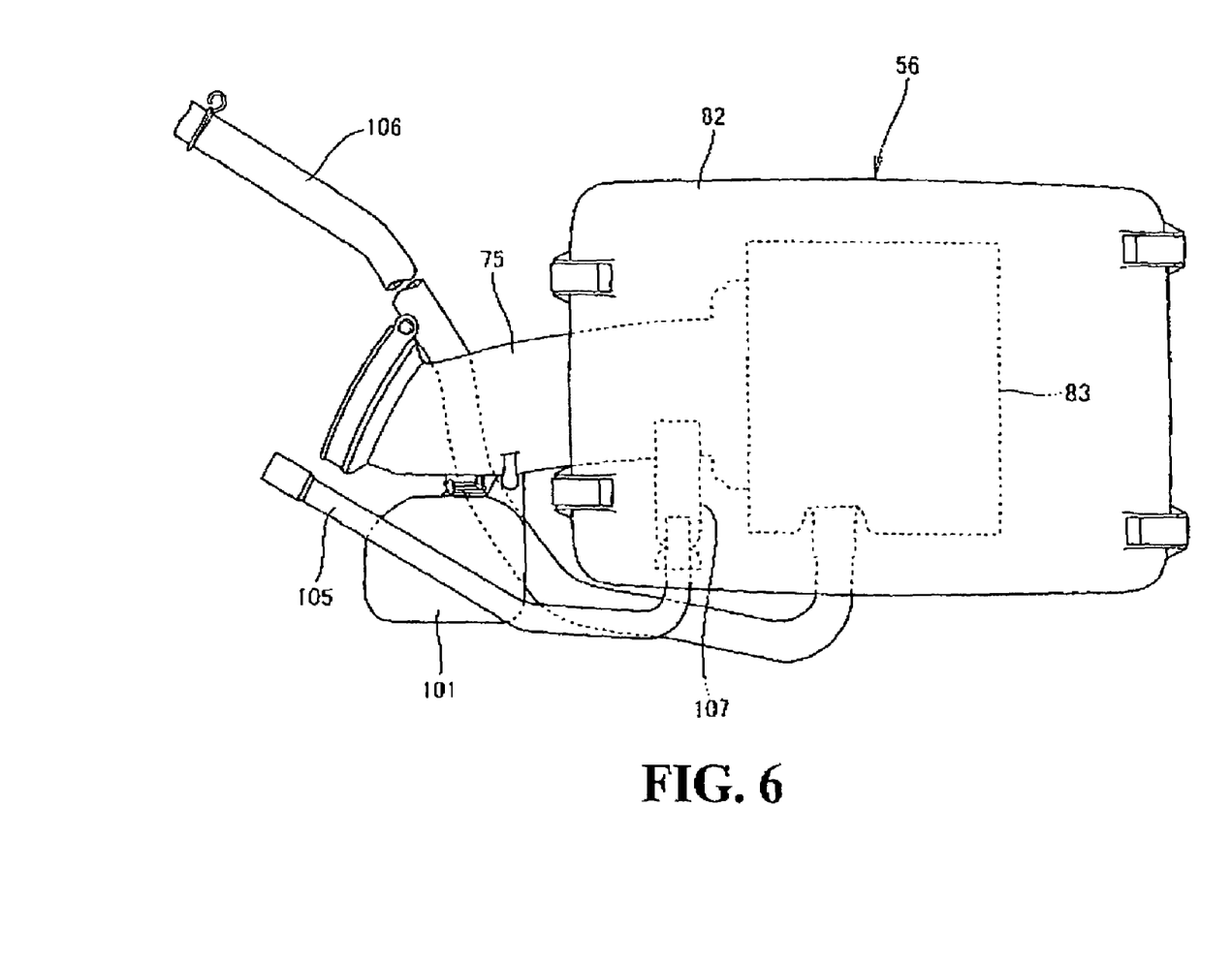
FIG. 6 is a plan view for explaining tubes connected to the air cleaner device.

FIG. 6 is a plan view for explaining tubes connected to the air cleaner device according to the present invention. FIG. 6 shows a state in which a first tube 105 and a second tube 106 are connected to the air cleaner body 56.

The first tube 105 is connected at one end thereof to the carburetor 33 (see FIG. 5) and is inserted at an opposite end thereof into the air cleaner body 56. The interior of the carburetor 33 is open to the atmosphere, allowing a negative pressure to escape. Numeral 107 denotes a filter attached to a front end portion of the first tube 105, which front end portion is inserted into the air cleaner body 56, to prevent oil, water and dust from being sucked into the first tube 105.

On end of the second tube 106 is connected to the interior of the crank case of the engine 22 (see FIG. 5) and an opposite end thereof faces the air cleaner element 83 installed within the air cleaner body 56, conducting blow-by gas present within the crank case into the air cleaner body 56. The blow-by gas present within the air cleaner body 56 is recycled into the engine through the connecting tube 75 and the carburetor 33.

As described above in connection with FIGS. 2, 3 and 5, according to the first aspect of the present invention, the vehicle 10 with right and left seats 43, 44 mounted to the body frame 11, and with an engine 22 disposed below the seats 43 and 44 includes an air cleaner device 35 for the supply of air to the engine 22 disposed behind the engine. The air cleaner device 35 includes the air cleaner body 56 containing the air cleaner element 83 (see FIG. 4) and the snorkel 77 connected to the air cleaner body 56 to introduce the outside air into the air cleaner body 56. The air cleaner device 35 also includes the snorkel 77 extending forward of the vehicle past a side of the cylinder portion 22a which projects upward from the engine 22, and the front end of the snorkel 77 opened between the right and left seats 43, 44.

The snorkel 77 is provided in the air cleaner body 56 of the vehicle provided with the right and left seats 43, 44, therefore, for example even if the air cleaner body 56 is disposed at a position lower than the seats 43 and 44, it is possible to minimize the influence of water-covering, and even when the air cleaner body 56 is covered with water, the intake port 77a as a front-end opening of the snorkel 77 is difficult to be flooded and it is possible to make the entry of water into the air cleaner body 56 difficult.

In addition, the front end of the snorkel 77 is opened between the right and left seats 43, 44, so when the vehicle 10 runs in a deep water level, the driver can easily judge the degree of water-covering in the opening 77a of the snorkel 77 and take an appropriate countermeasure while checking the opening 77a at a short distance. Therefore, the reliability of the vehicle 10 when running across a river or a marsh can be improved.

Moreover, since air is introduced through the snorkel 77 which is open between the right and left seats 43, 44 where there is little dust rolled up by the rear wheels 31, it is possible to minimize the entry of dust into the air cleaner body 56. Further, since air is introduced from above the upper partition wall 38 of the engine room 40 (see FIG. 1), it is possible to avoid sucking high-temperature air warmed up by the engine 22, whereby the charging efficiency is enhanced and it is possible to improve the output of the engine 22.

According to the second aspect of the present invention, when the pair of right and left rear side frames 54 provided in the body frame 11 are extended in the vehicular longitudinal direction, the exhaust pipe 96 is extended backward of the vehicle from the front portion of the engine 22, and the muffler 57 is attached to the rear end of the exhaust pipe 96 and disposed between the right and left rear side frames 54, the air cleaner body 56 is disposed between the right and left rear side frames 54 and spacedly from the muffler by being inclined relative to the longitudinal direction of the vehicle.

Since the air cleaner body 56 is disposed between the right and left rear side frames 54 and spacedly from the muffler 57 by being inclined relative t the vehicular longitudinal direction, even if the space between the right and left rear side frames 54 is narrow, it is possible to make the distance between the air cleaner body 56 and the exhaust pipe 96 and the distance between the air cleaner body 56 and the muffler 57 longer and hence possible to make the air cleaner body 56 difficult to be influenced by the heat generated from the exhaust pipe 96 and the muffler 57. Consequently, it is possible to simplify or omit an anti-heat member for the air cleaner body 56 and hence possible to reduce the cost.

Although in this embodiment the snorkel 77 is connected to the side face of the air cleaner body 56 to which the connecting tube 75 is also connected as shown in FIG. 5, this constitutes no limitation. The snorkel 77 may be connected to a face of the air cleaner body 56 different from the connected face of the connecting tube 75, e.g., a side face located on the vehicle right side.

The air cleaner device of the present invention is suitable for a vehicle having a pair of right and left longitudinally extending frame members (especially narrowly spaced right and left frame members).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner device in a vehicle wherein right and left seats are mounted to a body frame, an engine is disposed below said seats, and said air cleaner device is disposed behind said engine to supply outside air to the engine, said air cleaner device comprising:

an air cleaner body containing an air cleaner element; and a snorkel connected to said air cleaner body to introduce the outside air into said air cleaner body, wherein said snorkel extends in forward direction from the air cleaner body toward a front of the vehicle and passes along a side of a cylinder portion which projects upward from said engine, and wherein a front end of said snorkel opens between said right and left seats.

2. The air cleaner device in a vehicle according to claim 1,
wherein right and left side frames are provided in said body frame, the right and left frames extending in a longitudinal direction of the vehicle,
wherein an exhaust pipe extends toward a back part of the vehicle from a front portion of said engine, and a muffler is connected to a rear end of said exhaust pipe,
wherein said air cleaner body and said muffler are both disposed between the right and left side frames, said air cleaner body being spaced apart from said muffler by being inclined relative to the longitudinal direction of the vehicle.

3. The air cleaner device in a vehicle according to claim 1, wherein the right and left side frames are right and left rear side frames.

4. The air cleaner device in a vehicle according to claim 1, wherein an upper partition wall is provided for partitioning the engine and a passenger room, and the snorkel projects upwardly through the upper partition wall so that an intake port of the snorkel is higher than the upper partition wall.

5. The air cleaner device in a vehicle according to claim 4, wherein a cover is provided for covering the intake port of the snorkel from above.

6. The air cleaner device in a vehicle according to claim 2, wherein the exhaust pipe is connected at one end thereof to a front side of the cylinder portion of the engine, and extends backward while being bent in U shape.

7. The air cleaner device in a vehicle according to claim 1, wherein said snorkel extends forward from the air cleaner body and passes between the side of the cylinder portion and a side partition wall.

8. The air cleaner device in a vehicle according to claim 1, wherein said snorkel extends in the forward direction from the air cleaner body from a position behind the engine and opens at an air intake port at a position forward and above the engine.

9. The air cleaner device in a vehicle according to claim 1, wherein said snorkel extends in the forward direction along one side of the engine, and an exhaust pipe extends in a rearward direction along an opposite side of the engine.

10. The air cleaner device in a vehicle according to claim 2, wherein a rear portion of said air cleaner device is closer to the one of the side frames than is a front portion of said air cleaner device, in order that a space is provided between a side of said air cleaner device and said muffler.

11. An air cleaner device in a vehicle wherein right and left seats are mounted to a body frame, an engine is disposed below said seats, and said air cleaner device is disposed behind said engine to supply outside air to the engine, said air cleaner device comprising:
an air cleaner body; and
a snorkel connected to said air cleaner body to introduce the outside air into said air cleaner body,
wherein said snorkel extends in forward direction from the air cleaner body toward a front of the vehicle and passes along a side of a cylinder portion which projects upward from said engine, and
wherein a front end of said snorkel opens between said right and left seats,
wherein said snorkel inclines gradually upward as it extends in the forward direction.

12. The air cleaner device in a vehicle according to claim 11,
wherein right and left side frames are provided in said body frame, the right and left frames extending in a longitudinal direction of the vehicle,
wherein an exhaust pipe extends toward a back part of the vehicle from a front portion of said engine, and a muffler is connected to a rear end of said exhaust pipe,
wherein said air cleaner body and said muffler are both disposed between the right and left side frames, said air cleaner body being spaced apart from said muffler by being inclined relative to the longitudinal direction of the vehicle.

13. The air cleaner device in a vehicle according to claim 11, wherein the right and left side frames are right and left rear side frames.

14. The air cleaner device in a vehicle according to claim 11, wherein an upper partition wall is provided for partitioning the engine and a passenger room, and the snorkel projects upwardly through the upper partition wall so that an intake port of the snorkel is higher than the upper partition wall.

15. The air cleaner device in a vehicle according to claim 14, wherein a cover is provided for covering the intake port of the snorkel from above.

16. The air cleaner device in a vehicle according to claim 12, wherein the exhaust pipe is connected at one end thereof to a front side of the cylinder portion of the engine, and extends backward while being bent in U shape.

17. The air cleaner device in a vehicle according to claim 11, wherein said snorkel extends forward from the air cleaner body and passes between the side of the cylinder portion and a side partition wall.

18. The air cleaner device in a vehicle according to claim 11, wherein said snorkel extends in the forward direction from the air cleaner body from a position behind the engine and opens at an air intake port at a position forward and above the engine.

19. The air cleaner device in a vehicle according to claim 11, wherein said snorkel extends in the forward direction along one side of the engine, and an exhaust pipe extends in a rearward direction along an opposite side of the engine.

20. The air cleaner device in a vehicle according to claim 12, wherein a rear portion of said air cleaner device is closer to the one of the side frames than is a front portion of said air cleaner device, in order that a space is provided between a side of said air cleaner device and said muffler.

* * * * *